United States Patent
Martin et al.

(10) Patent No.: US 8,301,678 B2
(45) Date of Patent: Oct. 30, 2012

(54) METHOD AND DEVICE FOR FAST CORRELATION CALCULATION

(75) Inventors: Nicolas Martin, Bourg les Valence (FR); Yves Clauzel, Montelimar (FR)

(73) Assignee: Thales (FR)

(*) Notice: Subject to any disclaimer, the term of this patent is extended or adjusted under 35 U.S.C. 154(b) by 1074 days.

(21) Appl. No.: 12/280,698

(22) PCT Filed: Mar. 5, 2007

(86) PCT No.: PCT/EP2007/052037
§ 371 (c)(1),
(2), (4) Date: Aug. 26, 2008

(87) PCT Pub. No.: WO2007/107445
PCT Pub. Date: Sep. 27, 2007

(65) Prior Publication Data
US 2009/0259707 A1    Oct. 15, 2009

(30) Foreign Application Priority Data
Mar. 21, 2006  (FR) ...................................... 06 02459

(51) Int. Cl.
*G06F 17/15* (2006.01)
(52) U.S. Cl. ........................................................ 708/422
(58) Field of Classification Search ..................... None
See application file for complete search history.

(56) References Cited

U.S. PATENT DOCUMENTS

| | | | | |
|---|---|---|---|---|
| 5,483,243 A | * | 1/1996 | Gramlich et al. | 342/189 |
| 6,005,903 A | * | 12/1999 | Mendelovicz | 375/367 |
| 6,466,958 B1 | * | 10/2002 | Van Wechel et al. | 708/422 |
| 7,492,810 B2 | * | 2/2009 | Harrison | 375/150 |
| 2003/0076910 A1 | * | 4/2003 | Van Wechel et al. | 375/354 |
| 2011/0254732 A1 | * | 10/2011 | Martin et al. | 342/357.59 |

FOREIGN PATENT DOCUMENTS

EP    0789467 A2    8/1997
(Continued)

OTHER PUBLICATIONS

Polydoros A et al: "A Unified Approach to Serial Search Spread-Spectrum Code Acquisition-Part II: A Matched-Filter Receiver"; IEEE Transactions on Communications, vol. COM-32, No. 5, (May 1984), p. 550-560, XP001079090; IEEE, US; ISSN: 0090-6778.

(Continued)

*Primary Examiner* — David H Malzahn
(74) *Attorney, Agent, or Firm* — Lowe Hauptman Ham & Berner (57) ABSTRACT

The field of the invention is that of the reception of a radionavigation signal originating from a satellite positioning system such as the GPS system. The present invention concerns a method for calculating correlations between a first sequence and a second sequence, said first sequence and said second sequence having a duration $D_{Code}$, the first sequence being extracted from a digital signal comprising a code, said code comprising elementary time divisions, called chips, of mean duration $D_{chip}$, said chips being synchronized with pulses delivered by an NCO oscillator at the mean frequency $2/D_{chip}$, the second sequence resulting from a sampling at a frequency $F_e$ of an analog signal, the frequency $F_e$ being greater than $2/D_{chip}$. According to the invention, the method comprises a step of aggregating samples of the second sequence, over consecutive integration intervals of duration equal on average to $D_{chip}/2$, starting at each pulse of the NCO oscillator, so as to determine results of elementary aggregates.

5 Claims, 11 Drawing Sheets

FOREIGN PATENT DOCUMENTS

| | | |
|---|---|---|
| WO | 0065751 A1 | 11/2000 |
| WO | 03003807 A2 | 1/2003 |
| WO | 2005109028 A1 | 11/2005 |

OTHER PUBLICATIONS

Polydoros A et al: "A Unified Approach to Serial Search Spread-Spectrum Code Acquisition-Part I: General Theory"; IEEE Transactions on Communications, vol. VOM-32, No. 5, (May 1984), p. 542-549; XP002289420; IEEE, US; ISSN: 0090-6778.

Dafesh P A et al: "Practical and Theoretical Tradeoffs of Active Parallel Correlator and Passive Matched Filter Acquisition Implementations"; Proceedings of the IAIN World Congress in Association With the U.S. Ion Annual Meetings, Jun. 26-28, 2000, San Diego, CA, US, (Jun. 26, 2000), XP008073717.

* cited by examiner

METHOD AND DEVICE FOR FAST CORRELATION CALCULATION

CROSS-REFERENCE TO RELATED APPLICATIONS

The present Application is based on International Application No. PCT/EP2007/052037, filed on Mar. 5, 2007, which in turn corresponds to French Application No. 06 02459 filed on Mar. 21, 2006, and priority is hereby claimed under 35 USC §119 based on these applications. Each of these applications are hereby incorporated by reference in their entirety into the present application.

FIELD OF THE INVENTION

The field of the invention is that of the reception of a radionavigation signal originating from a satellite positioning system such as the GPS system (acronym standing for the expression "Global Positioning System"). More particularly, the invention relates to the acceleration of the correlation calculations implemented for synchronizing the radionavigation signal with a code generated locally on a receiver.

BACKGROUND OF THE INVENTION

For a satellite positioning system receiver, a duration of radionavigation signal acquisition which is short constitutes a sought-after characteristic for a positioning system. Specifically, when turning on a receiver, the duration of acquisition is the duration for which the positioning information cannot yet be delivered by the receiver.

The manner of operation of the GPS system is succinctly recalled. It consists of a constellation of 28 satellites and of a terrestrial network of reference stations on land. Each satellite gravitates at about 20,000 km from the Earth with a period of revolution of 12 hours. Each of them transmits two signals, one at 1575.452 MHz for civil applications and the other at 1227.6 MHz for reserved-access applications. The signal transmitted by a satellite consists of a carrier, optionally of a sub-carrier in the case of a BOC modulation, modulated by a known spreading code and optionally by unknown data. All the satellites transmit on the same frequencies and the signals transmitted are differentiated by their code.

These codes generally exhibit a period T, which may be short, for example 1 ms, or very long on the time scale considered, for example a week, but they may also be non-periodic, as is the case for example for encrypted signals. The codes typically consist of a large number of elementary time divisions, also called code "chips" which have a mean duration equal to $D_{chip}$.

The positioning of the receiver is obtained by measuring the distance between a satellite and the receiver on the basis of the duration of propagation of the signal between this satellite and the receiver. In the receiver, a replica of the code transmitted is generated locally; the time shift between the signal received and the local signal, that is to say the replica of the code, corresponds to the sought-after duration of propagation. This shift is measured by placing the signal received and the local signal in phase; the criterion of placing in phase corresponds to maximizing the correlation function of the two signals, that is to say to searching for a peak in correlation results between the signal received and the local signal, assumptions of different shift between the signal received and the local signal being considered for each correlation calculation.

The correlation calculations are performed on the basis of the real and imaginary components of the signal received, resulting from a sampling of the analog radionavigation signal performed at a frequency $F_e$ of greater than $2/D_{chip}$, where $D_{chip}$ is the mean duration of a code chip, according to Shannon's criterion. At the output of the antenna of the receiver, the signal is, in a conventional manner, converted into intermediate frequency, filtered, sampled, then converted into baseband by digital processing, before correlation with a local code of a satellite.

A correlation calculation is based on an assumption made about the date of receipt of the signal transmitted by the satellite at the receiver antenna level. Correlation calculations are performed for various assumptions corresponding to various reception dates spaced apart by a duration of half a code chip with respect to one another. The correlation calculations are performed over an integration interval whose duration $T_{int}$ can be varied as a function of the signal-to-noise ratio predicted a priori. For a periodic code of period T equal to 1024 chips, this makes it necessary to test up to (2.1024)=2048 assumptions, i.e. consequently 2048 correlation calculations to be carried out.

Additionally, in this case, the calculation of a correlation between the signal received and the local signal for an assumption regarding the date of receipt of the code received corresponds to $T_{int} \cdot F_e$ products between samples of the two signals followed by $T_{int} \cdot F_e - 1$ sums of the results of the products. When the duration of a calculation of a correlation equals $D_{Calcul}$, and if the calculations of the 2048 correlations are carried out sequentially, the total duration of the calculation of the correlations then equals $2048 \cdot D_{Calcul}$. This total duration can exceed the ten or so minutes for placing in phase the code of the signal received, that is to say for accessing and using the data produced by the satellite which transmits the signal.

With integration interval of fixed duration, a first solution for reducing the total duration of the calculation of the correlations consists in reducing the duration of a correlation calculation, for example by performing the operations (products followed by sums) in parallel rather than performing them in series as described previously. In this way, the total duration of calculation of the correlations is reduced, since the operations are carried out simultaneously.

The standpoint of this solution is adopted hereinafter.

In a certain number of situations, the reduction obtained in the total duration of the calculation of the correlations by the first solution presented is not sufficient, this being the case for example when the period T of the code is long or when the number of elementary correlations to be performed is multiplied because of a significant number of assumptions to be made about the frequency of the signal to be considered in order to compensate for the Doppler effect.

The aim of the invention is therefore to be able to reduce the total duration of the calculation of the correlations by avoiding repeating intermediate calculations which are common from one correlation calculation to another.

SUMMARY OF THE INVENTION

To achieve this aim, the invention proposes a method for calculating correlations between a first sequence and a second sequence, said first sequence and said second sequence each having a duration $D_{Code}$, the first sequence being extracted from a digital signal comprising a code, said code comprising elementary time divisions, called chips, of a duration $D_{chip}$, said chips being sampled on pulses delivered by an NCO oscillator at the mean frequency $2/D_{chip}$, the second sequence resulting from a sampling at a frequency $F_e$ of an analog signal, the frequency $F_e$ being greater than $2/D_{chip}$, characterized in that it comprises a step of aggregating the samples of the second sequence, over consecutive integration intervals of duration equal on average to $D_{chip}/2$, starting at each pulse of the NCO oscillator, so as to determine results of elementary aggregates.

A first advantage of the invention is that it contributes to reducing the duration of an elementary correlation calculation. Specifically, aggregation of samples of the second sequence makes it possible, as will be shown further on, to reduce the number of arithmetic operations to be carried out to obtain an elementary correlation calculation result, notably products between samples of code and of signal. Aggregation is equivalent to common factoring which is made possible by the stability of the value of the code over the duration of the aggregation. This advantage of the invention is all the more significant the higher the duration of the aggregation with respect to the duration of a sample of signal at $F_e$ of the second sequence.

The advantage of the invention is apparent when it is required to carry out a series of $N_c$ elementary correlation calculations. Thus, when it is possible to store intermediate calculation results, for example results of elementary aggregates, which are common to the $N_c$ calculations, this contributes to reducing the total duration necessary to carry out the $N_c$ correlation calculations, on condition that the duration necessary to perform the intermediate calculations is greater than the duration necessary to access the stored results of these calculations.

The subject of the invention is also a receiver of a radionavigation signal characterized in that it comprises a digital component able to implement the method such as described, for example an ASIC or an FPGA.

Another advantage of the invention is that, since the method of correlation calculation according to the invention requires fewer arithmetic operations than the prior art methods, a digital component implementing the method according to the invention requires fewer logic operators carrying out these products in parallel. The gain in space in the circuits of the digital component, which are engendered by this logic operator saving, may give rise to an increase in the calculation capability which makes it possible to indirectly improve the speed of the correlation calculations or to a reduction in the electrical consumption of the circuits of the digital component.

Finally, another benefit of the invention resides in the possibility that it offers of temporally multiplexing the calculations and reducing the number of operators that it is necessary to implement simultaneously. Specifically, it is possible to profit from the fact that the operating frequency of the digital component ($F_{smp}$) is much higher than $F_{code}$ and to use one and the same operator repeatedly, for the duration of half a chip.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

From one figure to another, the same elements are labeled by the same references.

Figure 1:
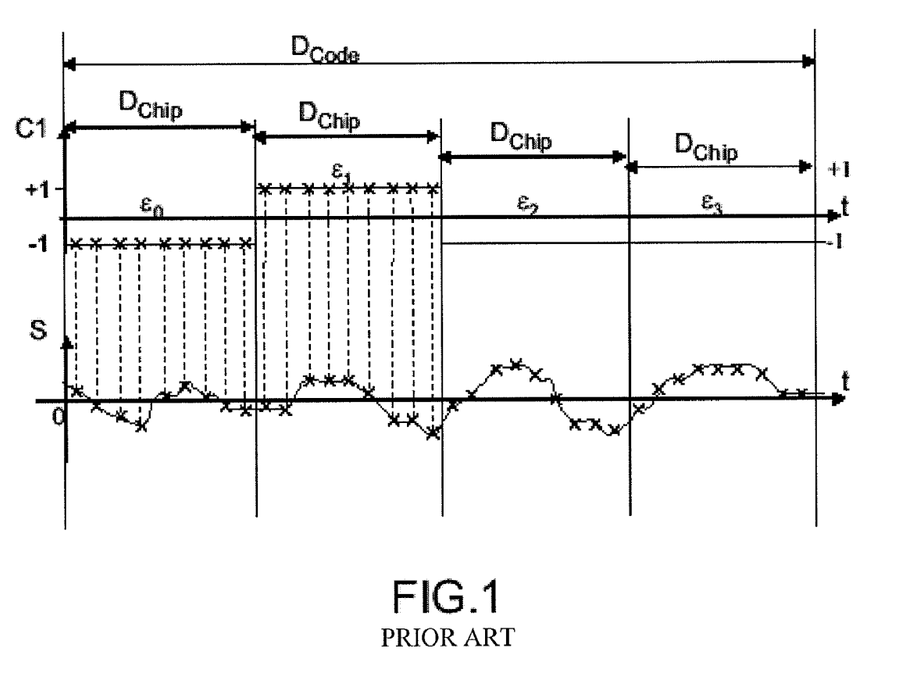
FIG. 1 represents temporal signals explaining a method of correlation calculation according to the prior art.

FIG. 1 represents, along one and the same time axis, a temporal evolution $C1(t)$ of a pseudo-random code generated by a receiver of a satellite positioning system, and a temporal evolution $S(t)$ of a radionavigation signal received by the receiver.

The pseudo-random code is a signed binary code, equaling +1 or −1, which is generated locally by the receiver of a satellite positioning system. The locally generated code has a duration $D_{Code}$, it comprises elementary time divisions, called code chips, of mean duration $D_{chip}$. To simplify the representation of FIG. 1, a code comprising four chips has been chosen, but the code could comprise a much bigger number of chips, for example 1024, or more. Over the duration of a chip, the code retains a constant value: the successive values taken by the code are named $\epsilon_i$ where i is an index identifying a chip of the code generated by the receiver.

On reception, the information contained in the radionavigation signal is extracted by two successive demodulations. A first demodulation makes it possible to transpose the signal received into baseband. This demodulation is carried out with the aid of local carriers generated by one or more analog oscillators (before sampling) and by a digital oscillator driven in frequency by the receiver (after sampling). A second demodulation makes it possible to despread the series of binary information (or code received) present in the signal received with the aid of binary sequences (or local code) generated locally by a pseudo-random binary sequence generator.

The present invention relates to a simplification of the second demodulation. Hereinafter, an analog signal which is sampled at a frequency $F_e$ greater than $2/D_{chip}$ and placed in baseband will be called the "signal received" or "signal S". In the representation of FIG. 1, crosses depict the sampled values of the signal received.

According to the prior art, a correlation calculation between a signal received and a locally generated code is carried out in several steps:

carrying out a sampling of the code C1 synchronous with the sampling of the signal received, multiplying pairwise the samples of the code and of the signal received, corresponding to one and the same sampling date, over the duration $D_{Code}$ so as to determine $N_{smp}=F_e \cdot D_{Code}$ results of products of samples, summing the results of products of samples.

The result of the correlation calculation is expressed in the following form:

$$Correlation_1 = \sum_{i=1}^{N_{smp}} S(t_i) C1(t_i)$$

where i is a sampling index, $t_i$ is the ith date of sampling of the signal received S, $S(t_i)$ is the value of the signal S at the date $t_i$ and $C1(t_i)$ is the value of the code at the date $t_i$.

In accordance with the expression for $Correlation_1$, a correlation calculation according to the prior art requires that $N_{smp}$ products between digital samples followed by $N_{smp}-1$ sums of results of these products of samples be carried out successively. According to the prior art, when a series of M elementary correlation calculations is carried out, the total number of products to be carried out is $M \cdot N_{smp}$ and the number of additions to be performed equals $M \cdot (N_{smp}-1)$.

Figure 2:
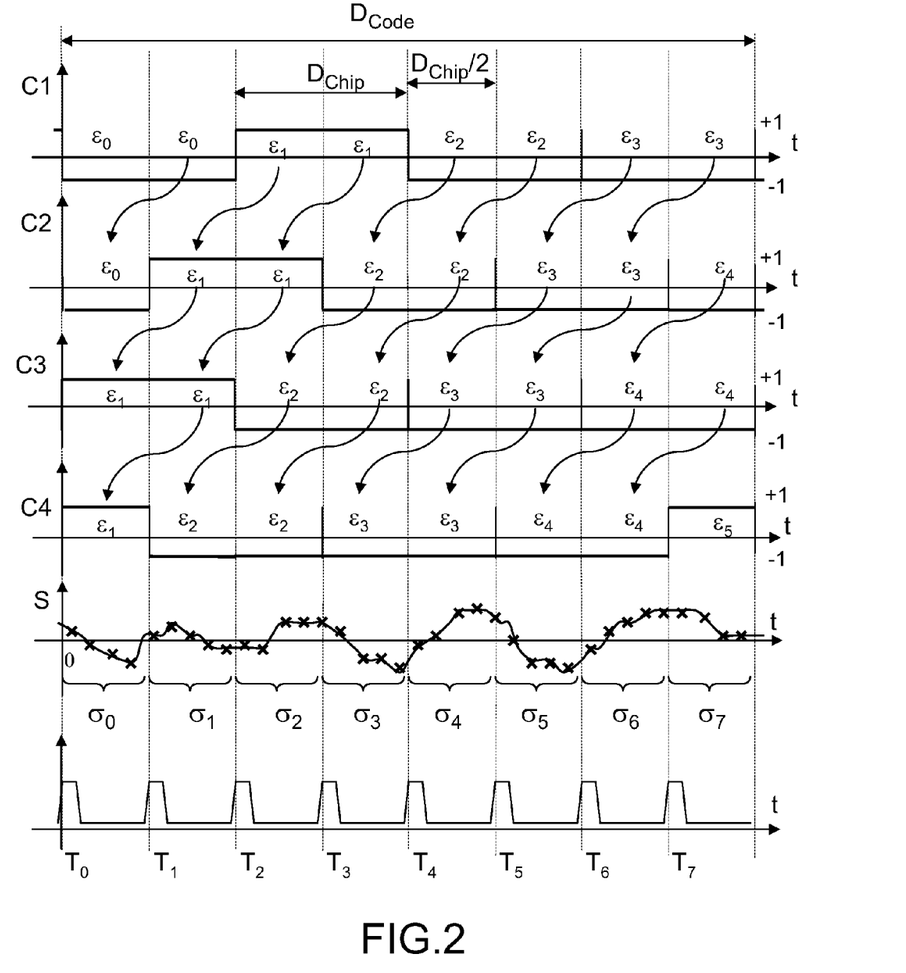
FIG. 2 serves as support for a presentation of the principle, on an example of temporal signals, of the methods for calculating four correlations, according to the invention.

FIG. 2 represents, along one and the same time axis, four temporal evolutions of pseudo-random code: $C1(t)$, $C2(t)$, $C3(t)$, $C4(t)$, corresponding to four assumptions regarding the position of the code received, a temporal evolution S(t) of the radionavigation signal received by the receiver, and pulses generated locally by the receiver.

The pulses are generated locally by an NCO oscillator integrated into the receiver, at the mean frequency $1/(2 \cdot D_{chip})$, they trigger the transitions between the code chips of the sequence C1 at the mean frequency $1/D_{chip}$. The pulses coincide with sampling instants of the signal received, at the frequency $F_{smp}$. The time elapsed between two pulses corresponds on average to $D_{chip}/2$, but with a jitter due to the non-coincidence between the sampling frequency $F_{smp}$ and the frequency of the local code.

The invention finds a particular benefit when one seeks to calculate the results of a series of correlations between first sequences and a second sequence. The four first sequences C1, C2, C3, C4 have an identical duration equal to $D_{Code}$. The first sequences C2, C3 and C4 are deduced from the sequence C1 by a time shift corresponding respectively to the duration of half a chip, a chip and a chip and a half.

The second sequence results from a sampling at a frequency $F_e$ of an analog signal, the frequency $F_e$ being greater than $2/D_{chip}$.

The correlation of C1 and of S, called $Correlation_1$, on the one hand, the correlation of C2 and of S, called $Correlation_2$, on the other hand, the correlation of C3 and of S, called $Correlation_3$, and finally the correlation of C4 and of S, called $Correlation_4$, can be expressed with the aid of values $\sigma_i$ which are results of elementary aggregates of values of consecutive samples of the signal S at sampling dates $t_i$ over the duration of the integration interval, that is to say at the duration separating two consecutive pulses of the NCO oscillator which corresponds to the duration of half a chip. Given that the value taken by S is constant for the duration of half a chip, these four correlations can be expressed as follows:

$$Corr_1 = \epsilon_0 \cdot \sigma_0 + \epsilon_0 \cdot \sigma_1 + \epsilon_1 \cdot \sigma_2 + \epsilon_1 \cdot \sigma_3 + \epsilon_2 \cdot \sigma_4 + \epsilon_2 \cdot \sigma_5 + \epsilon_3 \cdot \sigma_6 + \epsilon_3 \cdot \sigma_7$$

$$Corr_2 = \epsilon_0 \cdot \sigma_0 + \epsilon_1 \cdot \sigma_1 + \epsilon_1 \cdot \sigma_2 + \epsilon_2 \cdot \sigma_3 + \epsilon_2 \cdot \sigma_4 + \epsilon_3 \cdot \sigma_5 + \epsilon_3 \cdot \sigma_6 + \epsilon_4 \cdot \sigma_7$$

$$Corr_3 = \epsilon_1 \cdot \sigma_0 + \epsilon_1 \cdot \sigma_1 + \epsilon_2 \cdot \sigma_2 + \epsilon_2 \cdot \sigma_3 + \epsilon_3 \cdot \sigma_4 + \epsilon_3 \cdot \sigma_5 + \epsilon_4 \cdot \sigma_6 + \epsilon_4 \cdot \sigma_7$$

$$Corr_4 = \epsilon_1 \cdot \sigma_0 + \epsilon_2 \cdot \sigma_1 + \epsilon_2 \cdot \sigma_2 + \epsilon_3 \cdot \sigma_3 + \epsilon_3 \cdot \sigma_4 + \epsilon_4 \cdot \sigma_5 + \epsilon_4 \cdot \sigma_6 + \epsilon_5 \cdot \sigma_7$$

In the example represented in FIG. 2, thirty-six samples are computed during the integration interval $D_{Code}$. According to the prior art the calculation of the four correlations requires (4*35) one hundred and forty additions and (4*36) one hundred and forty-four products.

To calculate according to the invention the four correlations, the eight elementary aggregates $\sigma_0$, $\sigma_1$, $\sigma_2$, $\sigma_3$, $\sigma_4$, $\sigma_5$, $\sigma_6$, $\sigma_7$ are calculated first of all. For example, $\sigma_0$ requires three additions to aggregate the four samples of S lying between $T_0$ and $T_1$, $\sigma_1$ requires four additions to aggregate the five samples of S lying between $T_1$ and $T_2$, etc. In total twenty-eight additions are necessary to determine the values of the elementary aggregates.

For each of the correlations, the eight elementary aggregates are thereafter weighted by suitable values $\epsilon_i$. The suitable values $\epsilon_i$ are the values taken by the code sequence for the duration of the integration interval which corresponds to the elementary aggregate $\sigma_i$. In this way, eight values of weighted aggregates are thus obtained that are summed together. For each of the correlations, the weighting and summation steps represent eight new products and eight new additions. For the four correlation calculations as a whole, the method of calculation according to the invention requires (28+4*8) sixty additions and (4*8) thirty-two products, which in this example represents a reduction of fifty-seven percent in the number of additions and a reduction of seventy-eight percent in the number of products with respect to the same calculation performed according to the prior art.

In the expression for $Corr_1$, $Corr_2$, $Corr_3$, $Corr_4$, it is possible to factor the values of $\epsilon_i$. Doing so culminates in four new expressions for the correlations to be calculated:

$$Corr_1 = \epsilon_0 \cdot (\sigma_0 + \sigma_1) + \epsilon_1 \cdot (\sigma_2 + \sigma_3) + \epsilon_2 \cdot (\sigma_4 + \sigma_5) + \epsilon_3 \cdot (\sigma_6 + \sigma_7)$$

$$Corr_2 = \epsilon_0 \sigma_0 + \epsilon_1 \cdot (\sigma_1 + \sigma_2) + \epsilon_2 \cdot (\sigma_3 + \sigma_4) + \epsilon_3 \cdot (\sigma_5 + \sigma_6) + \epsilon_4 \cdot \sigma_7$$

$$Corr_3 = \epsilon_1 \cdot (\sigma_0 + \sigma_1) + \epsilon_2 \cdot (\sigma_2 + \sigma_3) + \epsilon_3 \cdot (\sigma_4 + \sigma_5) + \epsilon_4 \cdot (\sigma_6 + \sigma_7)$$

$$Corr_4 = \epsilon_1 \cdot \sigma_0 + \epsilon_2 \cdot (\sigma_1 + \sigma_2) + \epsilon_3 \cdot (\sigma_3 + \sigma_4) + \epsilon_4 \cdot (\sigma_5 + \sigma_6) + \epsilon_5 \cdot \sigma_7$$

These new expressions bring to light a variant of the method according to the invention for carrying out a calculation of the four correlations while further reducing the number of additions and products to be performed.

Specifically, to carry out these four correlation calculations, it is observed that it is possible to simplify the calculations by storing double elementary aggregates which consist of a sum of two consecutive values of $\sigma_i$. Consider, for example, four double elementary aggregates $(\sigma_0+\sigma_1)$, $(\sigma_2+\sigma_3)$, $(\sigma_4+\sigma_5)$, $(\sigma_6+\sigma_7)$ for calculating the expressions $Corr_1$ and $Corr_3$ and three double elementary aggregates $(\sigma_1+\sigma_2)$, $(\sigma_3+\sigma_4)$, $(\sigma_5+\sigma_6)$ for calculating the expressions $Corr_2$ and $Corr_4$.

In this case, on top of the twenty-eight additions necessary to individually calculate the eight elementary aggregates, seven new additions are simply carried out to calculate the seven double elementary aggregates. According to the correlation calculation, an elementary aggregate, or a double elementary aggregate is thereafter weighted by a suitable value $\epsilon_i$ so as to obtain factors that are summed together. For the four correlation calculations as a whole, the variant of the method of calculation according to the invention therefore requires in total forty-nine additions and eighteen products, which in this example represents a reduction of sixty five percent in the number of additions and a reduction of eighty eight percent in the number of products with respect to the same correlation calculation performed according to the prior art.

Figure 3A:
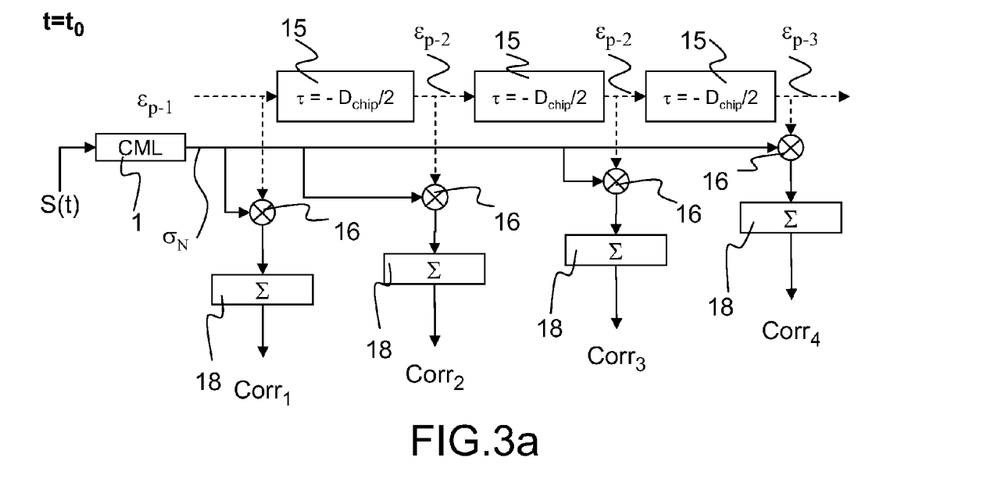
FIGS. 3A through 3C schematically represent a first embodiment of a correlator architecture known by the name "Multicorrelator", implementing the method of calculation according to the invention.
Figure 3B:
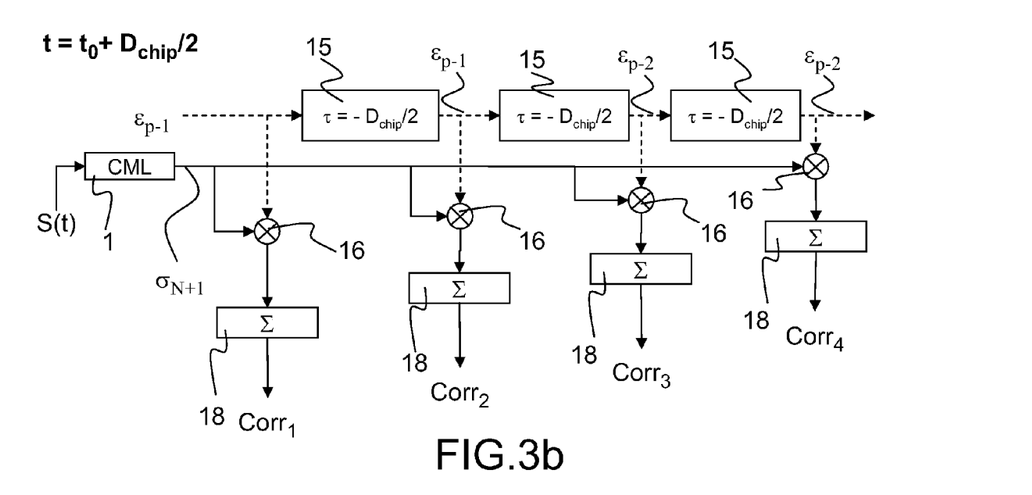
Figure 3C:
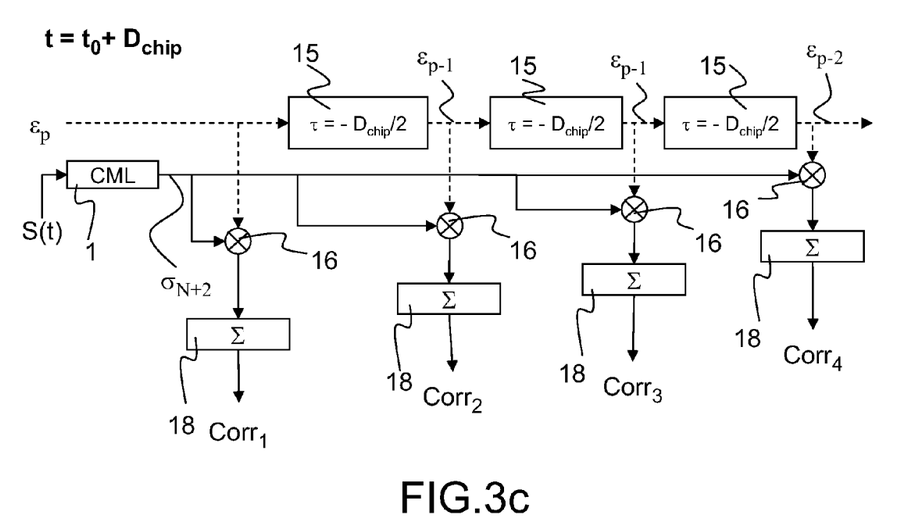

FIGS. 3A through 3C illustrate the principle of a first embodiment of a device according to the invention known by the names "Multi-correlators", "Active Parallel Correlator", or by the acronym ACP. A satellite signal receiver of a satellite positioning system acquires over a duration $D_{Code}$ an analog radionavigation signal S and samples it at a frequency $F_e$. The receiver calculates correlation results between the signal S and a code generated locally on the receiver.

The locally generated pseudo-random code is a signal which comprises chips of mean duration $D_{chip}$ during which the code retains a constant value $\epsilon_i$. Pulses, generated by an NCO oscillator which is integrated into the receiver, drive transitions between the chips at the mean frequency $F_{code}=1/D_{chip}$. Other pulses generated by this NCO oscillator at a frequency $2 \cdot F_{code}$ are also employed to drive a sampling of the code at this frequency and to clock aggregations of code samples carried out between two successive pulses. The frequency $F_{code}$ is less than half the frequency of sampling of S, that is to say less than $F_e/2$.

The code sampled at the frequency $2 \cdot F_{code}$ is expressed in the form of a series $\epsilon_i$, of which two consecutive components are identical, where i is a code sample index that can go for example from 0 to p−1 where p is equal to the integer part of $D_{Code}/D_{chip}$. The values taken by the code sampled at the frequency $2 \cdot F_{code}$ are transmitted sequentially into a shift register, clocked with the pulses at the frequency $2 \cdot F_{code}$, generated by the NCO oscillator.

FIGS. 3a, 3b and 3c represent the same correlation calculation device at three successive instants $t_0$, $t_0+D_{chip}/2$ and $t_0+D_{chip}$ corresponding to a new pulse of the oscillator.

Between FIGS. 3a, 3b, and 3c the values $\epsilon_i$ stored in the registers 15 have moved from the left to the right of the figure. In a synchronous manner, the content of each register 15 of the shift register is dispatched to a first multiplicative operator input 16.

In parallel, an accumulation device CML, 1 aggregates samples of the signal S over a duration separating two consecutive pulses of the NCO oscillator, that is to say on average over the duration $D_{chip}/2$. Hereinafter, these sample aggregates are denoted $Y_j$, where $\sigma_j$ is an elementary aggregate index that can go for example from 0 to 2·(p−1).

The values taken by the elementary aggregates are dispatched sequentially to the second inputs of the multiplicative operators 16. These dispatchings are synchronized with the pulses of the NCO oscillator. In FIGS. 3a, 3b and 3c, $\sigma_N$, $\sigma_{N+1}$ and $\sigma_{N+2}$ are dispatched successively to the second inputs of the multiplicative operators 16.

Advantageously, the results of elementary aggregates are employed to determine results of calculations of correlations between first sequences and a second sequence, the first sequences being deduced from one another by a time shift of duration $D_{chip}/2$.

On an output, each multiplicative operator 16 delivers at the frequency $2 \cdot F_{code}$ a result of a product of an elementary sampled code $\epsilon_i$ and of an elementary aggregate $\sigma_j$. This result corresponds to a step of weighting each elementary aggregate $\sigma_i$ by a value of the code sequence $\epsilon_i$ during the integration interval corresponding to the calculation of $\sigma_i$. These results are accumulated at the output of the multiplicative operators in accumulator devices $\Sigma$ 18.

Advantageously, the method according to the invention furthermore comprises, for each first sequence:
  a step of weighting each elementary aggregate result of the second sequence by the value of the chip of the first sequence at the start of the elementary aggregate, to obtain weighted aggregate results,
  a step of accumulating the weighted aggregate results.

Advantageously, the accumulation step delivers at least one result after p successive pulses of the NCO oscillator, where p is equal to the integer part of $D_{Code}/D_{chip}$.

If before the instant $t_0$ which corresponds to FIG. 3a, the summators are empty, they collect at the instant $t_0+D_{chip}$, which corresponds to FIG. 3c, three values of weighted aggregates made up like products of an elementary aggregate and of a sampled code.

After a large number of pulses, for example 2048, as many results of correlation calculations as the shift register has registers are available simultaneously. These results acquired in parallel are dispatched regularly to a computer which can, as a function of the results of correlation calculations collected, decide to resume correlation calculations with a delayed or advanced local code. This is the reason why this scheme is dubbed "active".

Figure 4A:
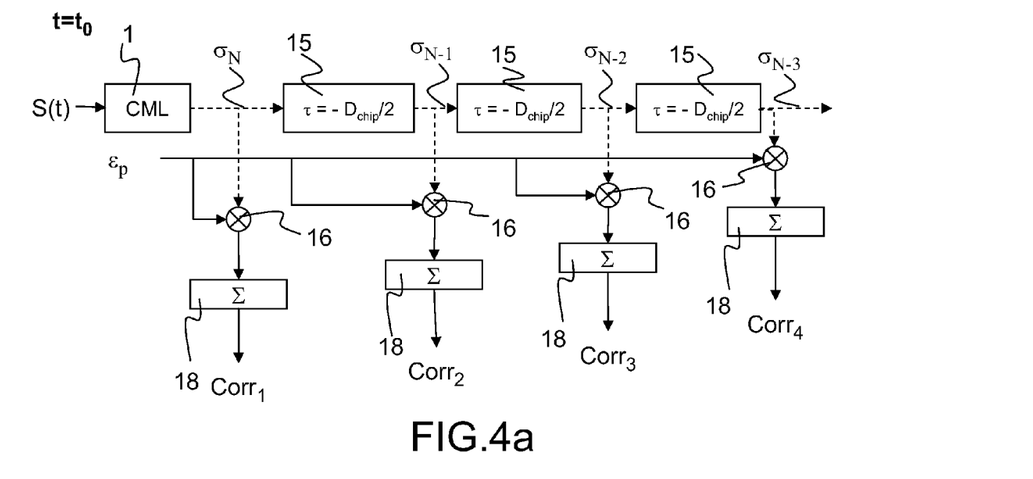
FIGS. 4A through 4C schematically represent a first variant embodiment of the architecture of a "Multicorrelator", implementing the method of calculation according to the invention.
Figure 4B:
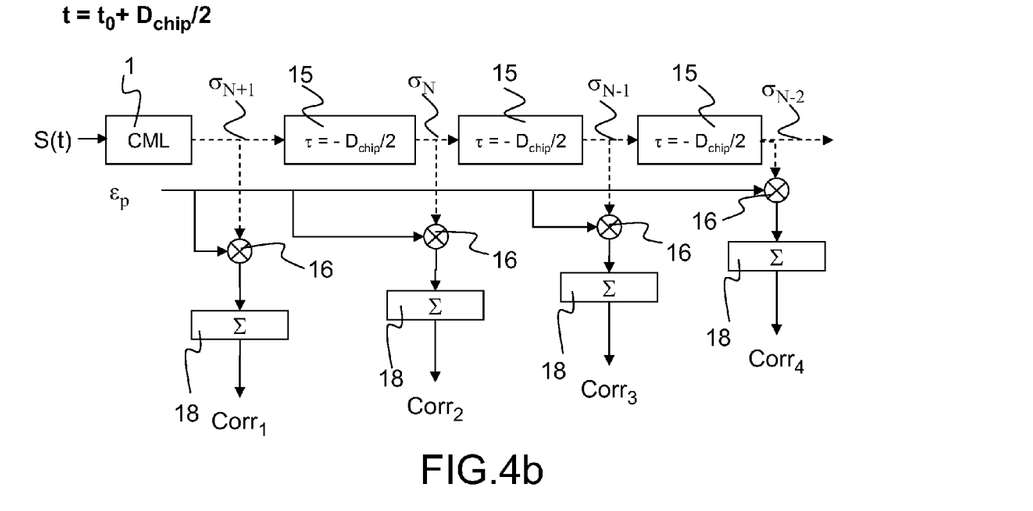
Figure 4C:
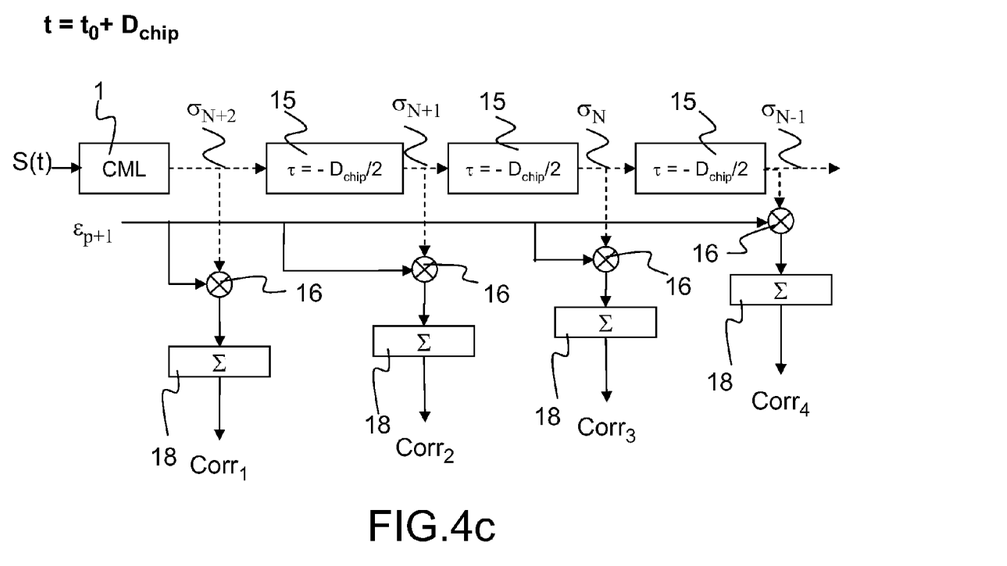

FIGS. 4A through 4C represent a variant of the architecture of a "Multicorrelator". This variant consists in swapping the roles of the codes and of the signal.

In the device according to the invention presented in FIGS. 3A through 3C, the correlation calculations are carried out between first sequences extracted from a digital signal comprising a local code and a second sequence resulting from a sampling at a frequency $F_e$ of a signal received, the first sequences being shifted temporally with respect to one another for each correlation calculation. In the variant presented in FIGS. 4A through 4C, the correlation calculations are carried out between a first sequence extracted from a digital signal comprising a local code and second sequences resulting from a sampling at a frequency $F_e$ of a signal received, the second sequences being shifted temporally with respect to one another for each correlation calculation.

FIGS. 4a, 4b and 4c represent the same correlation calculation device at three successive instants $t_0$, $t_0+D_{chip}/2$ and $t_0+D_{chip}$ corresponding to a new pulse of the NCO oscillator.

Advantageously, the results of elementary aggregates are employed to determine results of calculations of correlations between a first sequence and second sequences, the second sequences being deduced from one another by a time shift of duration $D_{Chip}/2$.

Advantageously, the method according to the invention furthermore comprises, for each second sequence:
  a step of weighting each elementary aggregate result of the second sequence by the value of the chip of the first sequence at the start of the elementary aggregate, to obtain weighted aggregate results,
  a step of accumulating the weighted aggregate results.

Figure 5A:
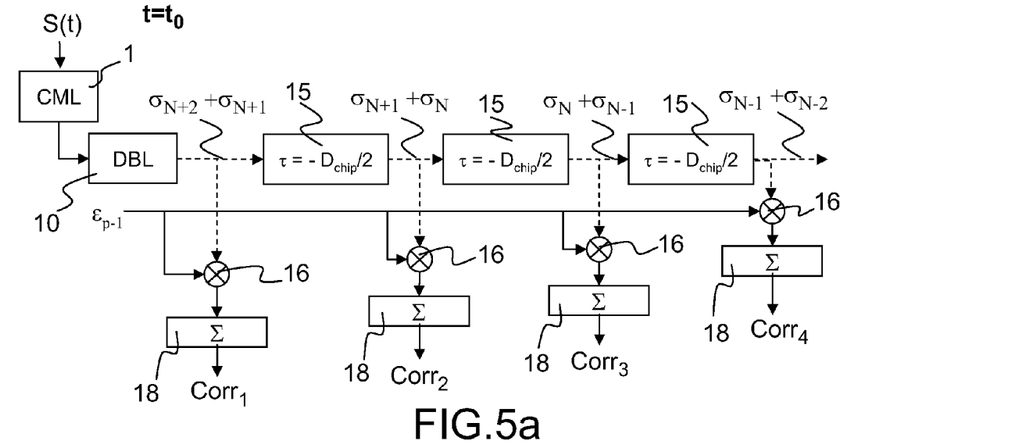
FIGS. 5A through 5C schematically represent a second variant of the architecture of a "Multicorrelator", implementing the method of calculation according to the invention.
Figure 5B:
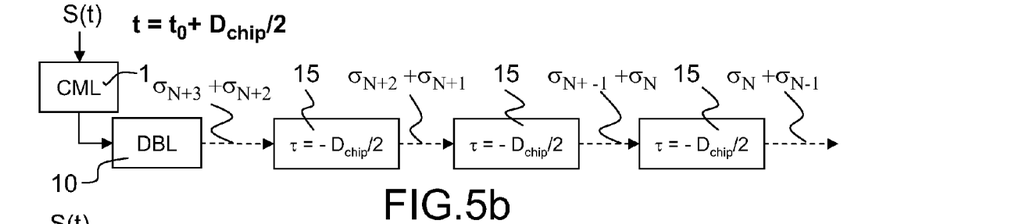
Figure 5C:
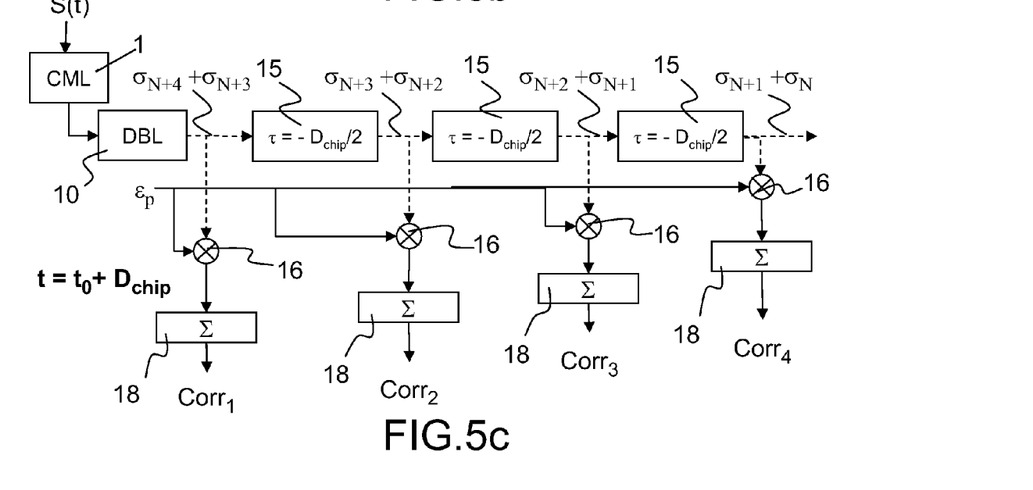

FIGS. 5A through 5C represent a second variant of the architecture of a "Multicorrelator". The advantage of this variant is a reduction in the number of operations (sums and products) to be performed to obtain results of correlation calculations between the code and the signal achieved by means of a factoring carried out by prior summation of two elementary aggregates.

The principle of this variant consists in inserting, between a step of aggregating samples of the signal S giving access to the results of elementary aggregates, and a transfer of the elementary aggregates to a shift register, a step of summing two consecutive elementary aggregates to obtain double elementary aggregate results.

This summation step is represented in FIG. 5 by a doubler operator DBL, 10 delivering a sum of two consecutive elementary aggregates for each new pulse of the NCO oscillator after the computation of the elementary aggregates by the accumulation device CML.

In this variant it is the double elementary aggregates that are transferred to the shift registers clocked by the pulses of the NCO.

FIGS. 5a, 5b and 5c represent the same correlation calculation device at three successive instants $t_0$, $t_0+D_{chip}/2$ and $t_0+D_{chip}$ each corresponding to a new pulse of the NCO oscillator.

If at the instant $t_0$, the doubler operator DBL delivers the value $\sigma_{N+2}+\sigma_{N+1}$, at the instant $t_0+D_{chip}/2$, the doubler operator delivers the value $\sigma_{N+3}+\sigma_{N+2}$ and at the instant $t_0+D_{chip}$, the doubler operator delivers the value $\sigma_{N+4}+\sigma_{N+3}$.

It is noted that there exists an overlap between the values delivered by the doubler operator, thus the value $\sigma_{N+1}$ is present at the output of the doubler operator at the instants $t_0$ and $t_0+D_{chip}/2$, which is irrelevant for the calculation of the correlations. This requires that one pulse out of two, here at the instant $t_0+D_{chip}/2$, the values present in the register 15 of the shift register are neither weighted by values of the code nor a fortiori accumulated in accumulator devices Σ unlike the two multicorrelator devices presented in FIGS. 3A through 3C and FIGS. 4A through 4C.

The multiplicative operators and the accumulator devices Σ which are present in FIG. 5a are not represented in FIG. 5b, so as to illustrate the absence of the weighting and summation step at instant $t_0+D_{chip}/2$. In reality, these devices are actually present but they are not active at this instant.

Advantageously, the method according to the invention comprises:
  a step of summing two results of consecutive elementary aggregates to obtain double elementary aggregate results,
  a step of weighting each result of double elementary aggregate of the second sequence by the value of the code of the first sequence to obtain results of weighted double aggregates,
  a step of accumulating the results of weighted double aggregates.

Figure 6A:
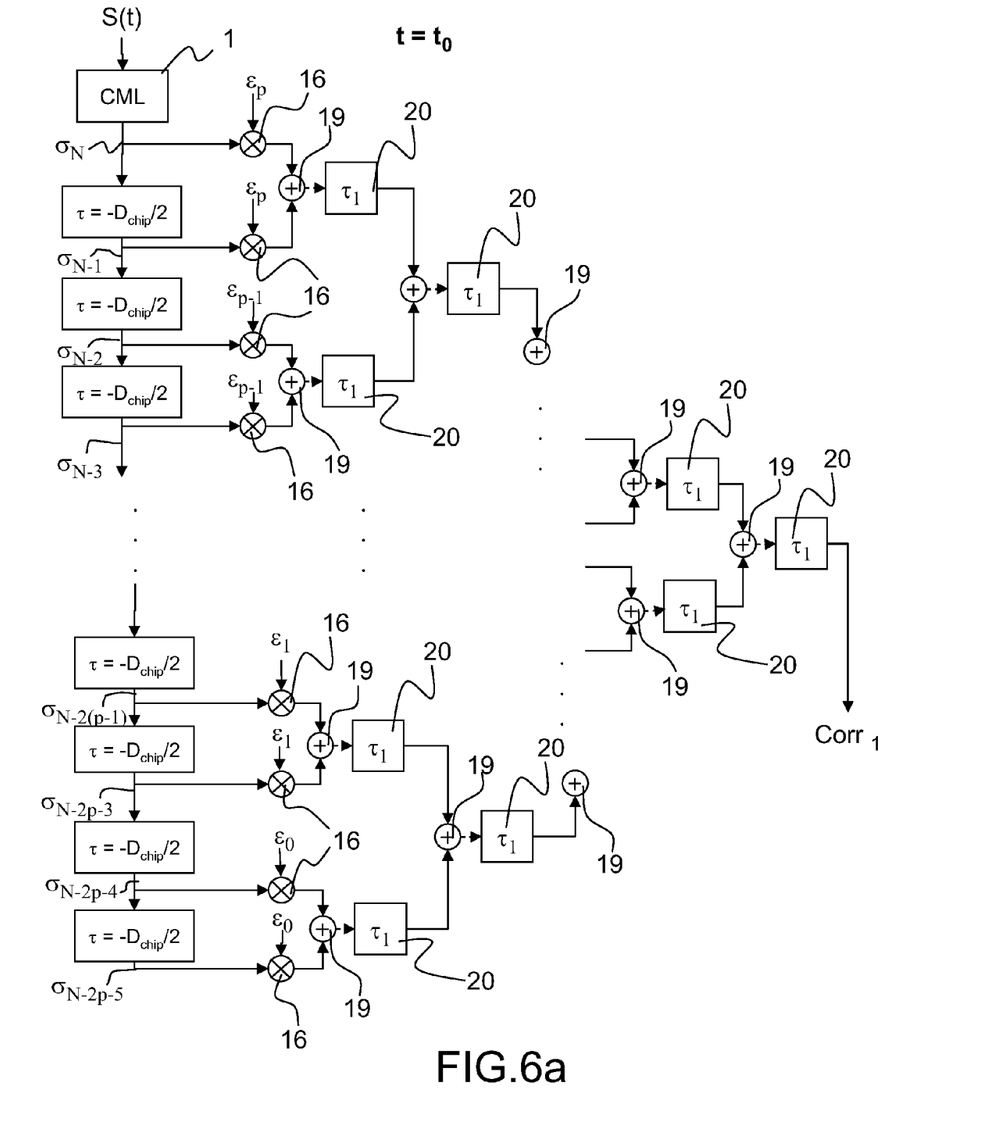
FIGS. 6A and 6B schematically represent a first embodiment of a correlator architecture known by the name "matched filter", implementing the method of calculation according to the invention.
Figure 6B:
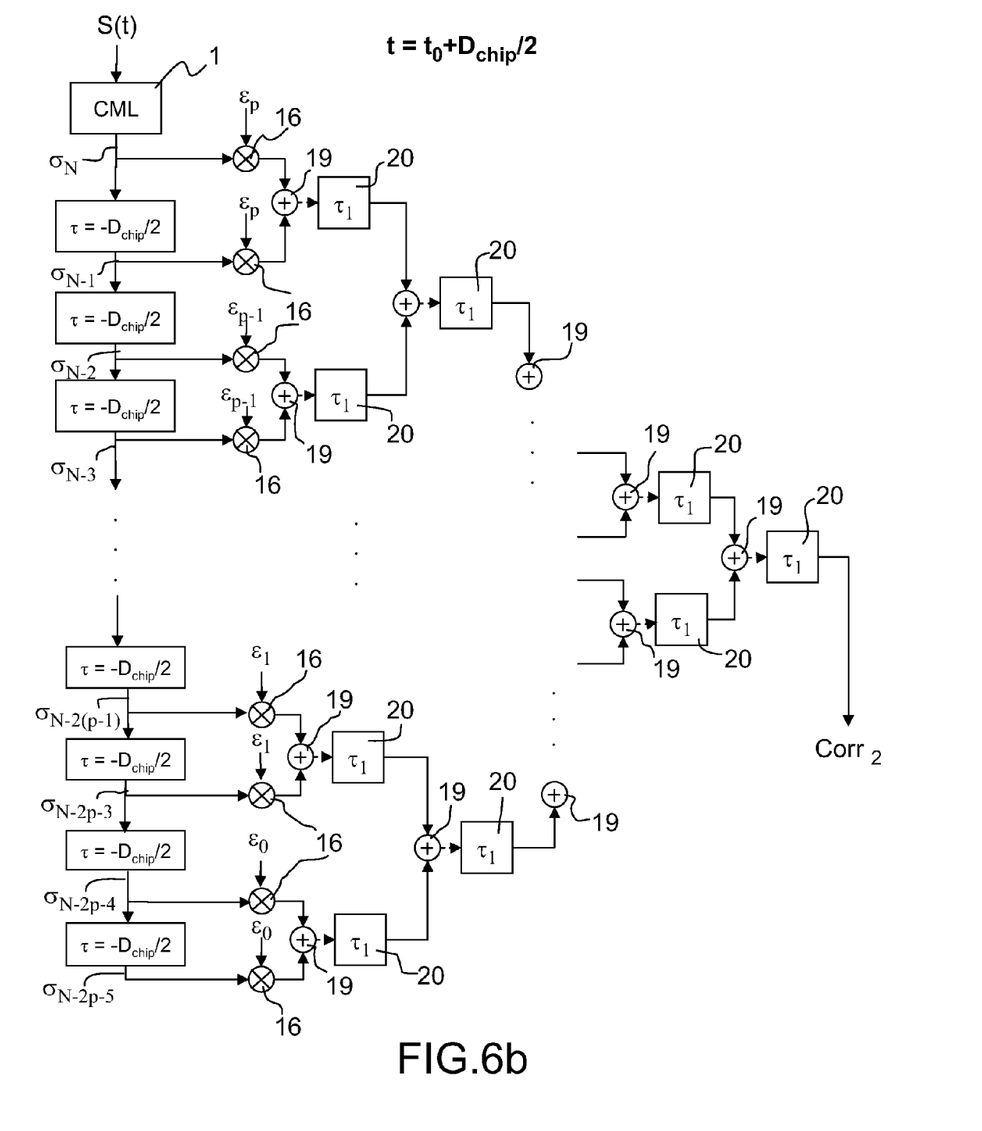

FIGS. 6A and 6B represent a second embodiment of a device according to the invention. This second embodiment relates to the implementation of a correlator architecture known by the names "matched filter", "Passive Matched filtering" or by the acronym PMF.

FIGS. 6a, 6b represent the same correlation calculation device at two successive instants $t_0$, $t_0+D_{chip}/2$ each corresponding to a new pulse of the NCO oscillator.

As in the device described in FIG. 4a, an accumulation device CML, 1 aggregates samples of the signal S over a duration separating two consecutive pulses of the NCO oscillator, that is to say on average over the duration $D_{chip}/2$. These sample aggregates are denoted $\sigma_j$, where j is an elementary aggregate index that can go for example from 0 to 2·(p−1).

The values taken by the elementary aggregates $\sigma_j$ are dispatched sequentially to a shift register comprising a number equal to 2·p of registers which is much greater than the number of registers encountered for the shift registers of the "multicorrelators". The content of each register 15 is transmitted to a first input of a multiplicative operator 16. In FIG. 6, the registers of the shift register are represented vertically.

The multiplicative operators comprise a second input to which a sampled code value $\epsilon_i$ is presented. This value remains constant for the duration of the correlation calculation. The multiplicative operators are grouped in pairs, and the operators belonging to one and the same pair receive an identical value $\epsilon_i$ on their second input.

Thus at the instant $t_0$ which corresponds to a pulse of the NCO oscillator, each multiplicative operator 16 delivers, on an output, a result of a product of a elementary sampled code $\epsilon_i$ and of an elementary aggregate $\sigma_j$. This result corresponds to a step of weighting each elementary aggregate $\sigma_i$ by a value of the code sequence $\epsilon_i$ during the integration interval corresponding to the calculation of $\sigma_i$. The results arising from two multiplicative operators 16 are transferred to a first and a second input of a summator device 19 delivering a sum of the weighted aggregates placed on the first and the second input.

The results of the sums of weighted aggregates are thereafter summed pairwise by means of a succession of summator devices 19, disposed in a pyramid or summation tree. A few exemplary summator devices 19, constituting a fraction of the pyramid, are represented in FIG. 6a.

Stabilization devices $\tau_1$, 20, are inserted between each summator device 19. The action of a stabilization device inserted between a first and a second summator device 19 consists in stabilizing the electrical signal at the output of the first summator device before it feeds an input of the second summator device, at the cost of a propagation delay in the pyramid. The output of the summator device 19 at the vertex of the pyramid constitutes the result of the correlation $Corr_1$.

At each pulse of the NCO oscillator a new elementary aggregate value is transferred to the shift register, all the contents of the registers 15 are transferred to the directly neighboring register, that is to say the content of a register is shifted one register downwards at each pulse, and a new correlation result, $Corr_2$, is available on the summator device 19 of the vertex of the pyramid, after a duration of physical propagation of the electrical signals for traversing the pyramid, from left to right.

Advantageously, the accumulation step delivers a result at each pulse of the NCO oscillator.

This embodiment is dubbed "passive" since, in the steady state, it makes it possible at each pulse of the operator NCO to access a new correlation calculation result. Over an equal integration interval length, the number of correlation results collected is markedly higher than that determined by a "multicorrelator" device. This advantage makes it possible to avoid resorting to a step of computer analysis to define the delay or advance to be assigned to the code to be tested.

Figure 7A:
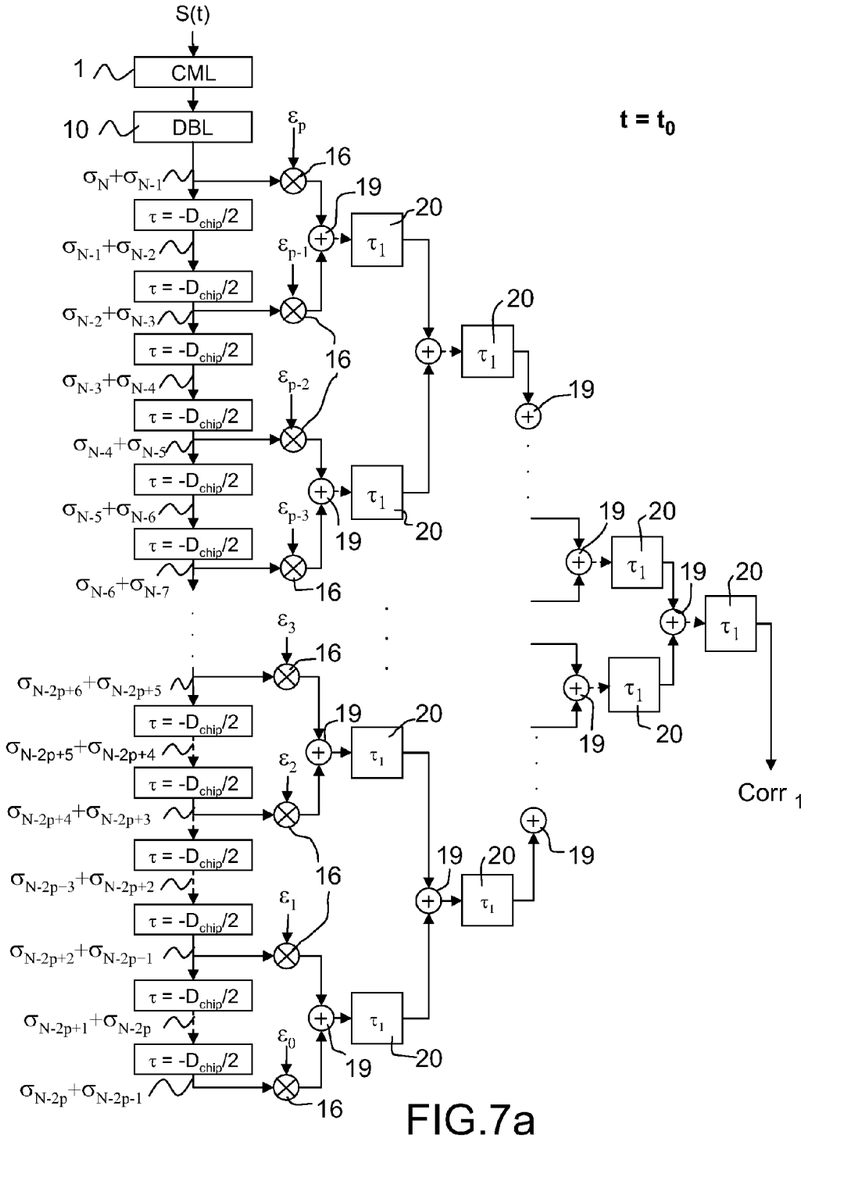
FIGS. 7A and 7B schematically represents a variant embodiment of the architecture of a "matched filter", implementing the method of calculation according to the invention.
Figure 7B:
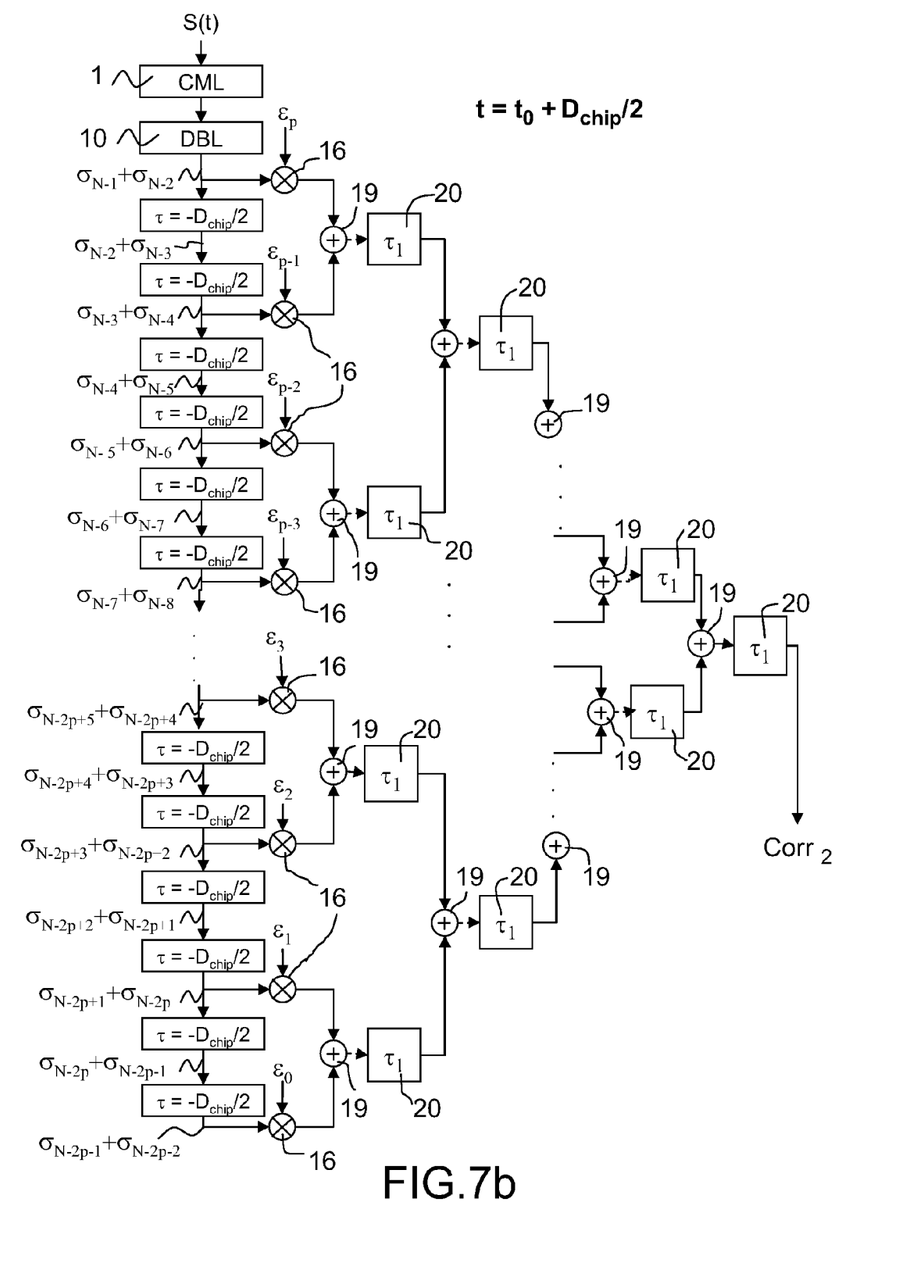

FIGS. 7A and 7B represent a variant of the device, represented in FIGS. 6A and 6B, according to the invention. FIGS. 7a, 7b represent the same correlation calculation device at two successive instants $t_0$, $t_0+D_{chip}/2$ each corresponding to a new pulse of the NCO oscillator.

An accumulation device CML, 1 aggregates samples of the signal S over a duration separating two consecutive pulses of the NCO oscillator, that is to say on average over the duration $D_{chip}/2$. These sample aggregates are denoted $\sigma_j$, where j is an elementary aggregate index that can go for example from 0 to 2·(p−1).

The principle of this variant consists in inserting, between a step of aggregating samples of the signal S giving access to the results of elementary aggregates, and a transfer of the elementary aggregates to a shift register, a step of summing two consecutive elementary aggregates to obtain double elementary aggregate results.

This summation step is represented in FIG. 7 by a doubler operator DBL, 10 delivering a sum of two consecutive elementary aggregates for each new pulse of the NCO oscillator after the computation of the elementary aggregates by the accumulation device CML.

The values of the sums of two consecutive elementary aggregates $\sigma_j+\sigma_{j+1}$, called "double elementary aggregate", are dispatched sequentially to a shift register comprising 2·p registers and identical to that represented in FIGS. 6A and 6B. The content of one register 15 out of two is transmitted to a first input of a multiplicative operator 16.

The multiplicative operators 16 comprise a second input to which a sampled code value $\epsilon_i$ is presented. This value remains constant for the duration of the correlation calculations. Thus, at the instant $t_0$ which corresponds to a pulse of the NCO oscillator, each multiplicative operator 16 delivers, on an output, a result of a product of a sampled code $\epsilon_i$ and of a double elementary aggregate. This result corresponds to a step of weighting each double elementary aggregate by a code value $\epsilon_i$. The results arising from two multiplicative operators 16 are transferred to a first and a second input of a summator device 19 delivering the sum of the weighted double aggregates placed on the first and the second input.

The results of the sums of the weighted double aggregates are thereafter summed pairwise by means of a succession of summator devices 19 disposed as a pyramid. A few exemplary summator devices 19, constituting a fraction of the pyramid, are represented in FIG. 7a.

Stabilization devices $\tau_1$ 20 are inserted between each summator device 19. The output of the summator device 19 at the vertex of the pyramid constitutes the result of the correlation $Corr_1$.

At each pulse of the NCO oscillator a new value of double elementary aggregate is transferred to the shift register, all the contents of the registers 15 are transferred to the directly neighboring register, that is to say the content of a register is shifted one register downwards at each pulse, and a new correlation result: $Corr_2$ is available on the summator device 19 of the vertex of the pyramid.

Advantageously, the first sequence is a pseudo-random code of BPSK type and the analog signal comprises a carrier modulated by the pseudo-random code.

Advantageously, the analog signal comprises a modulation by a sub-carrier.

Advantageously, a radionavigation signal receiver comprises a digital component of ASIC or FPGA type able to implement the method according to the invention.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A receiver of a radionavigation signal, comprising a digital component of ASIC or FPGA type able to implement a method for calculating correlations between a first sequence and a plurality of second sequences, said first sequence and one of said second sequences having a duration $D_{Code}$, the first sequence being extracted from a digital signal comprising a code, said code comprising elementary time divisions, called chips, of a duration $D_{chip}$, said chips being sampled in samples on pulses delivered by an NCO oscillator at the mean frequency $2/D_{chip}$, the second sequence resulting from a sampling at a frequency Fe of an analog signal, the frequency Fe being greater than $2/D_{chip}$, said method comprising a step of aggregating the samples of the second sequence, over consecutive integration intervals of duration equal on average to $D_{chip}/2$, starting at each pulse of the NCO oscillator, so as to determine results of elementary aggregates, the results of elementary aggregates being employed to determine results of calculations of correlations between a first sequence and the plurality of second sequences, the plurality of second sequences being deduced from one another by a time shift of duration $D_{chip}/2$ comprising the following steps using a logic device:

summing two results of consecutive elementary aggregates to obtain double elementary aggregate results;

weighting each result of double elementary aggregate of the second sequence by the value of the code of the first sequence to obtain results of weighted double aggregates; and accumulating the results of weighted double aggregates.

2. The receiver of the radionavigation signal as claimed in claim 1, wherein the accumulation step delivers at least one result after p successive pulses of the NCO oscillator, where p is equal to the integer part of $D_{Code}/D_{chip}$.

3. The receiver of the radionavigation signal as claimed in claim 1, wherein the accumulation step delivers a result at each pulse of the NCO oscillator.

4. The receiver of the radionavigation signal as claimed in claim 1, wherein the first sequence is a pseudo-random code, the analog signal comprises a carrier modulated by the pseudo-random code and in that the modulation is of BPSK type.

5. The receiver of the radionavigation signal as claimed in claim 1, wherein the analog signal comprises a modulation by a sub-carrier.

* * * * *